3,661,995
PROCESS FOR THE MANUFACTURE OF
α,ω-ALIPHATIC DIAMINES
Dhafir Yusuf Waddan and Derek Williams, Manchester, England, assignors to Imperial Chemical Industries Limited, London, England
No Drawing. Filed Jan. 7, 1969, Ser. No. 789,587
Claims priority, application Great Britain, Jan. 31, 1968, 4,959/68
Int. Cl. C07c 85/12
U.S. Cl. 260—583 K
8 Claims

ABSTRACT OF THE DISCLOSURE

Aliphatic α,ω-diamines are produced by the hydrogenation of aliphatic α,ω-dinitriles at pressures of from 1–500 atmospheres and at a temperature of 50–200° C. in the presence of a Ziegler catalyst prepared from Group VIII metal compounds and metal alkyls, metal aryls or hydrides of alkali metals.

---

This invention relates to a process for the manufacture of aliphatic diamines, and particularly hexamethylene diamine.

Hexamethylenediamine is commonly manufactured by hydrogenation of adiponitrile in the presence of a catalyst usually comprising metallic nickel or cobalt with or without a support. An excess of ammonia is used in this process to suppress the formation of by-products, for example imines. Dinitriles are especially prone to produce imines, some of cyclic character and some polymeric, and unless a large excess of ammonia is used the yield of primary amines from dinitriles is low. Thus when adiponitrile is hydrogenated in the presence of nickel or cobalt catalyst but without using a large excess of ammonia only a very poor yield of hexamethylene diamine is obtained.

According to the invention a process for the manufacture of an aliphatic diamine comprises treating an aliphatic dinitrile with hydrogen under pressure and at elevated temperature in the presence of a Ziegler catalyst containing a Group VIII metal.

Aliphatic dinitriles which may be used in the process include alpha-omega dinitriles, e.g. glutaronitrile, adiponitrile and suberonitrile, also branched chain dinitriles, e.g. methylglutaronitrile and unsaturated dinitriles, e.g. dicyanobutenes.

The expression Ziegler catalyst is well-known in the art and indicates a combination of compounds from each of two classes hereinafter called Classes A and B respectively and optionally at least one compound from a third class hereinafter called Class C. These classes are as follows:

CLASS A

Transition metal compounds. The general term "transition metal" means a metal which in elementary form has an incomplete shell of $d$ or $f$ electrons. In particular the Group VIII metals, i.e. the elements of atomic numbers 26–28, 44–46 and 76–78 which are contained in the particular Ziegler catalysts used in our process, are all transition metals. The preferred Group VIII metals are iron, cobalt, nickel and palladium. Cobalt and nickel are especially preferred. Compounds of these metals which may be used in the combination include oxides, hydroxides, alkoxides, salts (particularly organic acid salts, e.g. acetates, propionates, octoates, benzoates or naphthenates), complexes containing pi- or sigma-bonded ligands or allyl groups attached to metal (e.g. bis-cyclopentadienyl and carbonyl complexes) and complexes of the metals in zero valent form with olefinic and other donors, e.g. amines, nitriles, ethers, thio-compounds, phosphines and phosphites.

CLASS B

Certain compounds which have a reducing action on the metal compounds of Class A including metal alkyls or aryls, especially those in which an alkyl group is directly attached to aluminium, e.g. triethyl-, tripropyl- and triisobutylaluminium, monochlorodiethyl aluminium, dichloroethylaluminium, ethoxydiethylaluminium, diisobutylaluminium hydride and the etherides of these compounds. Other compounds in Class B are organic compounds of lithium, zinc or magnesium (e.g. lithium ethyl, lithium aluminium hydride, zinc diethyl and magnesium ethyl chloride), and hydrides of alkali metals e.g. sodium hydride or sodium borohydride.

CLASS C

Ligands which can co-ordinate with the combination of compounds from Classes A and B. These include ethers, e.g. diethyl ether and tetrahydrofuran; alcohols e.g. ethyl alcohol, methylalcohol, butylalcohol; phenols e.g. phenol, p-cresol; amines, especially tertiary amines e.g. triethylamine, pyridine; phosphines e.g. triphenylphosphine, 1,2-bis(diphenylphosphino)ethane; sulphides e.g. thiodioxane; and nitriles e.g. acetonitrile, benzonitrile.

Ziegler catalysts are made by bringing the components from Classes A and B together, optionally in the presence of a solvent for example a hydrocarbon e.g. cyclohexane or benzene, or an ether, e.g. tetrahydrofuran and allowing interaction to take place, either with free evolution of heat or with cooling. The word "combination" implies only that the components from Classes A and B are materials used to make the catalyst and carries no implication regarding the chemical structure of the catalyst. The optional component from Class C may be added before or after the components from Classes A and B are brought together.

The process of the invention may be operated under widely varied conditions of temperature and pressure. Thus temperatures of 0° to 250° C. (preferably 100° to 150° C.), and pressures of 1 to 500 atmospheres gauge (preferably 1 to 50 atmospheres gauge) may be used.

Some, but not all, of the catalysts used in the process of the invention are soluble in the dinitrile undergoing hydrogenation. When a soluble catalyst is used hydrogenation is rapid and consistent and is less susceptible to catalyst quality than is the case when an insoluble catalyst is used.

In the process of the invention it is not usually necessary to use such a vast excess of ammonia as is used in the known hydrogenation process. Even in complete absence of ammonia the production of imines as reduction products takes place only to a small extent.

It is greatly advantageously to operate the process without any added ammonia, using a catalyst which produces only minimal amounts of imines. For this purpose preferred catalysts include combinations from the following classes.

Class A1—Oxides, hydroxides or salts, especially carboxylic acid salts, of nickel or cobalt.
Class B1—Aluminium alkyls.
Class C1—(Optional) ethers or tertiary amines.

These preferred catalysts are particularly valuable in the reduction of adiponitrile to hexamethylenediamine without added ammonia, the hexamethylenediamine product being of satisfactory quality for use in the manufacture of nylon 6:6 (polyhexamethyleneadipamide).

As desired the process of the invention may be operated batch-wise or continuously.

For batch-wise operation it is convenient to introduce the Ziegler catalyst and the nitrile which is to be hydrogenated into a warmed autoclave from which moisture has been excluded by means of a stream of inert gas for example nitrogen. The autoclave may then be closed and pressurised with hydrogen and heated to the temperature at which hydrogen uptake proceeds, further hydrogen being introduced if necessary, until the hydrogenation is complete. At the end of the hydrogenation the product amine may be purified in known manner, for example by distillation.

For continuous operation the dinitrile and Ziegler catalyst may be continuously injected into a reduction zone in which contact is made with hydrogen, crude reduction product being continuously discharged from the zone and the diamine isolated therefrom. Catalyst and unreacted material may be recycled to the reduction zone if desired.

The invention is illustrated but not limited by the following examples in which the percentages are by weight:

EXAMPLE 1

Triisobutylaluminium (1.1 ml. of 50% solution in cyclohexane) was added drop by drop to cobalt acetate (0.2 g.) and adiponitrile (5 ml.) was then added. The mixture was charged into a stainless steel autoclave and kept for 8 hours under 400 p.s.i. of hydrogen at 120° C. with stirring. Gas chromatographic examination showed that the crude product contained:

|  | Percent |
|---|---|
| Hexamethyleneimine | 2.2 |
| Hexamethylenediamine | 90.6 |
| Aminocapronitrile | 1.7 |
| Adiponitrile | 5.4 |

EXAMPLE 2

Triisobutylaluminium (3 ml. of 33% solution in cyclohexane) was added drop by drop to cobalt octoate (0.7 g.) and adiponitrile (10 ml.) was then added. The mixture was charged into a stainless steel autoclave and kept for 5 hours under 400 p.s.i. of hydrogen at 120° C. with stirring. Gas chromatographic examination showed that the crude product contained:

|  | Percent |
|---|---|
| Hexamethyleneimine | 3.0 |
| Hexamethylenediamine | 96 |
| Adiponitrile | 0.91 |

EXAMPLE 3

Triisobutylaluminium (1 ml.) was added drop by drop to a solution of cobalt octoate (0.7 g.) in tetrahydrofuran (5 ml.) and adiponitrile (10 ml.) was then added. The mixture was charged into a stainless steel autoclave and kept for 5 hours at 120° C. under 400 p.s.i. of hydrogen with stirring. Gas chromatographic examination showed that the crude product contained:

|  | Percent |
|---|---|
| Hexamethyleneimine | 1.0 |
| Diaminocyclohexane | 1.09 |
| Hexamethylenediamine | 95.75 |
| Adiponitrile | 0.15 |

In place of tetrahydrofurane in this example there may be used an equivalent amount of diethyl ether, ethyl alcohol, phenol or triphenylphosphine.

EXAMPLE 4

Triisobutylaluminium (2 ml.) was added drop by drop to a solution of cobalt octoate (0.7 g.) in tetrahydrofuran (1 ml.) and adiponitrile (10 ml.) was then added. The mixture was charged into a stainless steel autoclave and kept for 4½ hours at 120° C. under 400 p.s.i.g. of hydrogen with stirring. Gas chromatographic examination showed that the product contained:

|  | Percent |
|---|---|
| Hexamethyleneimine | 1.76 |
| Hexamethylenediamine | 89.9 |
| Aminocapronitrile | 4.47 |
| Adiponitrile | 0.8 |

EXAMPLE 5

Triethylaluminium (2.2 ml. of 50% solution in cyclohexane) was added drop by drop to cobalt acetate (0.533 g.) in tetrahydrofuran (5 ml.) and adiponitrile (10 ml.) was then added. The mixture was kept at 125° C. under 450 p.s.i. of hydrogen for 4½ hours. Gas chromatographic examination showed that the crude product contained:

|  | Percent |
|---|---|
| Hexamethyleneimine | 2.47 |
| Hexamethylenediamine | 90.72 |
| Aminocapronitrile | 6.35 |
| Adiponitrile | 0.45 |

EXAMPLE 6

Triisobutylaluminium (20 ml. of 50% solution in cyclohexane) was added drop by drop to a solution of cobalt octoate (7 g.) in tetrahydrofuran (5 ml.). The resulted solution was charged into 1 l. stainless steel autoclave followed by adiponitrile (350 g.). The mixture was kept at 120° C. for 20 hours under 500 p.s.i. of hydrogen with stirring. Gas chromatographic examination showed that the crude product contained:

|  | Percent |
|---|---|
| Hexamethyleneimine | 2.5 |
| Diaminocyclohexane | 0.49 |
| Hexamethylenediamine | 94.7 |
| Adiponitrile | 0.3 |
| Hexamethylenetriamine | 1.04 |

335 g. of the product was subjected to fractional distillation. Pure hexamethylenediamine (300.4 g.) was distilled at 110° C./45 mm.

EXAMPLE 7

Triisobutylaluminium (1 ml.) was added to a solution of cobalt octoate (0.7 g.) and pyridine (0.5 ml.) in cyclohexane (5 ml.) followed by tetrahydrofurane (2 ml.) and adiponitrile (10 ml.). The mixture was charged into a stainless steel autoclave and kept at 120° C. under 500 p.s.i. of H$_2$ for one hour. Gas chromatographic examination showed that the product contained:

|  | Percent |
|---|---|
| Hexamethyleneimine | 1.8 |
| Hexamethylenediamine | 91.9 |
| Aminocapronitrile | 4.68 |
| Adiponitrile | 1.62 |

EXAMPLE 8

Diethylaluminium chloride (2.5 ml. of 50% solution in toluene) was added drop by drop to cobalt acetate (0.438 g.). Tetrahydrofurane (1 ml.) was then added followed by adiponitrile (15 ml.). The mixture was kept at 120° C. under 450 p.s.i. of hydrogen for 5 hours. Gas chromatographic examination showed that the crude product contained 79.5% of hexamethylenediamine.

EXAMPLE 9

Diisobutylaluminium sec-butoxide (2.1 ml.) of 50% solution in cyclohexane) was added drop by drop to cobalt acetate (0.237 g.). Tetrahydrofurane (2 ml.) was then added followed by adiponitrile (10 ml.). The mixture was kept at 130° C. under 500 p.s.i. of hydrogen for 5½ hours. Gas chromatographic examination showed that the crude product contained 46% of hexamethylenediamine.

EXAMPLE 10

Lithiumaluminium hydride (0.282 g.) in tetrahydrofurane (7 ml.) was added drop by drop to cobalt octoate (0.258 g.) followed by adiponitrile (10 ml.). The mixture was kept at 120° C. under 450 p.s.i. of hydrogen for 7 hours. Gas chromatographic examination showed that the crude product contained 25% of hexamethylenediamine.

In place of lithium aluminium hydride in this example an equivalent amount of sodium borohydride or zinc diethyl may be used.

EXAMPLE 11

Isopropylmagnesium bromide (0.64 g. in ether 3 ml.) was added drop by drop to cobalt (acetylacetonate)$_3$ (0.5 g. in benzene 6 ml.). Adiponitrile (10 ml.) was then added and the mixture was kept at 100° C. under 400 p.s.i. of hydrogen for 20 hours. Gas chromatographic examination showed that the crude product contained 53.6% hexamethylenediamine.

EXAMPLE 12

Butyllithium (1 g. of 37% in wax) was added to a solution of cobalt octoate (0.45 g.) in cyclohexane (2 ml.) followed by tetrahydrofurane (3 ml.) and adiponitrile (10 ml.). The mixture was kept at 120° C. under 500 p.s.i. of hydrogen for 7 hours. Gas chromatographic examination of the crude product indicated the presence of 10% hexamethylenediamine.

EXAMPLE 13

Triisobutylaluminium (2.17 ml. of 50% solution in cyclohexane) was added to nickel(acetate)$_2$ (0.520 g.) followed by tetrahydrofurane (7 ml.) and adiponitrile (10 ml.) The mixture was kept at 120° C. under 450 p.s.i. of hydrogen for 5 hours. Gas chromatographic examination showed that the crude product contained 82% hexamethylenediamine.

EXAMPLE 14

Triisobutylaluminium (4 ml.) was added drop by drop to cobalt dichloride (1.027 g.) in tetrahyrofurane (6 ml.) followed by adiponitrile (10 ml.). The mixture was kept at 125° C. under 500 p.s.i. of hydrogen for 20 hours. Gas chromatographic examination showed that the crude product contained 27% hexamethylenediamine.

EXAMPLE 15

Triisobutylaluminium (2.8 ml.) was added drop by drop to palladium acetate (0.424 g.) followed by tetrahydrofuran (6 ml.) and adiponitrile (10 ml.). The mixture was kept at 120° C. under 450 p.s.i. of hydrogen for 4½ hours. Gas chromatographic examination showed that the crude product contained 8% of hexamethylene diamine.

EXAMPLE 16

Diisobutylaluminiumhydride (0.76 ml. of 50% solution in toluene) was added to cobalt octoate (0.371 g.) followed by suberonitrile (5 ml.). The mixture was kept at 130° C. under 400 p.s.i. of hydrogen for 5 hours. The crude solid product (M.P. 49–51°) contained over 95% octamethylene diamine.

EXAMPLE 17

Triisobutylaluminium (1.07 ml. of 50% solution in toluene) was added to cobaltoctacarbonyl (0.29 g. in soluene 3 ml.) followed by adiponitrile (10 ml.). The mixture was kept at 135° C. for 5½ hours under 400 p.s.i. of hydrogen. Gas chromatographic examination of the crude product indicated the presence of 12% hexamethylenediamine.

EXAMPLE 18

Triethylaluminium (0.57 ml. of 50% solution in cyclohexane) was added to iron acetylacetonate (0.175 g. in toluene 1 ml.) and triethylamine (0.1 ml.) followed by adiponitrile (10 ml.). The mixture was kept at 130° C. for 5 hours under 400 p.s.i. of hydrogen. Gas chromatographic examination of the crude product indicated the presence of 5% hexamethylenediamine.

EXAMPLE 19

Triisobutylaluminium (1.24 ml. of 50% solution in n-hexane) was added to cobalt octoate (0.54 g. in cyclohexane 2 ml.) and triethylamine (0.2 ml.) followed by adiponitrile (10 ml.). The mixture was kept at 130° C. for 6 hours under 450 p.s.i. of hydrogen. Gas chromatographic examination showed that the crude product contained 92% hexamethylenediamine.

EXAMPLE 20

Triisobutylaluminium (1.3 ml. of 50% solution in n-hexane) was added to a mixture of cobalt octoate (0.55 g. in 2 ml. cyclohexane) and 1,5-cyclooctadiene (0.2 ml.) followed by adiponitrile (10 ml.). Then the mixture was kept at 125° C. for 6 hours under 400 p.s.i. of hydrogen. Gas chromatographic examination showed that the crude product contained 81% hexamethylene diamine.

EXAMPLE 21

Triisobutylaluminium (1.8 ml.) was added to cobalt hydroxide (1.038 g.) and the mixture was heated at 150° C. when a strong exothermic reaction took place. The mixture was cooled to room temperature and adiponitrile (10 ml.) was added. The resultant mixture was kept at 130° C. for 7 hours under 400 p.s.i. of hydrogen. Gas chromatographic examination showed that the crude product contained 78% hexamethylenediamine.

EXAMPLE 22

Triisobutylaluminium (1.07 ml. of 50% solution in toluene) was added to a mixture of cobalt octoate (0.371 g. in toluene 2 ml.) and hexamethylene diamine (1 g.). Adiponitrile (10 ml.) was then added and the mixture was kept at 130° C. for 6 hours under 400 p.s.i. of hydrogen. Gas chromatographic examination showed that the crude product contained 93% hexamethylenediamine.

EXAMPLE 23

Triisobutylaluminium (1.07 ml. of 50% solution in toluene) was added to a mixture of cobaltoctoate (0.371 g. in toluene 2 ml.) and ω-aminocapronitrile (1 ml.). Adiponitrile (10 ml.) was then added and the mixture was kept at 130° C. for 6 hours under 400 p.s.i. of hydrogen. Gas chromatographic examination showed that the crude product contained 87% hexamethylenediamine.

EXAMPLE 24

Triisobutylaluminium (1 ml. of 50% solution in toluene) was added to a mixture of cobaltoctoate (0.25 g. in toluene 1 ml.) and oxathiane (0.2 ml.). Adiponitrile was then added and the mixture was kept at 130° C. for 4 hours under 400 p.s.i. of hydrogen. Gas chromatographic examination showed that the crude product contained 81% hexamethylenediamine.

EXAMPLE 25

Sodiumdihydro bis(2-methoxyethoxy)aluminate (0.93 ml. of 70% solution in benzene) was added to cobaltoctoate (0.55 g. in tetrahydrofuran 2 ml.) followed by adiponitrile (10 ml.). The mixture was kept at 120° C. for 4 hours under 450 p.s.i. of hydrogen. Gas chromatographic examination of the crude product indicated the presence of hexamethylenediamine.

EXAMPLE 26

Triisobutylaluminium (1.07 ml. of 50% solution in toluene) was added to cobalt octoate (0.25 g. in toluene 1 ml.) followed by methylglutaronitrile (5 ml.). The mixture was kept at 130° C. for 5 hours under 450 p.s.i. of hydrogen. Gas chromatographic examination showed that the crude product contained 20% 2-methylpentamethylenediamine.

We claim:
1. Process for the manufacture of an aliphatic α,ω-diamine which comprises contacting an aliphatic α,ω-dinitrile having 5 to 8 carbon atoms with hydrogen under a pressure of 1 to 500 atmospheres gauge and at a temperature of 50° to 200° C. in the presence of a Ziegler catalyst which is a combination of
   (A) A compound of a Group VIII metal selected from the group consisting of oxides, hydroxides, halides, monocarboxylic acid salts, carbonyls and acetylacetonates of nickel, cobalt, iron and palladium, and
   (B) A compound having a reducing action on A and selected from the class consisting of aluminium, lithium, magnesium and zinc alkyls containing up to 4 carbon atoms in each alkyl group and alkali metal hydrides.
2. Process according to claim 1 wherein the Group VIII metal in the catalyst is cobalt.
3. Process according to claim 1 wherein the Group VIII metal in the catalyst is nickel.
4. Process according to claim 1 wherein the Ziegler catalyst is a combination of one of said Group VIII metal compounds with an aluminium alkyl containing up to 4 carbon atoms in each alkyl group.
5. Process according to claim 2 wherein the Ziegler catalyst is used in combination with an aluminium trialkyl containing up to 4 carbon atoms in each alkyl group.
6. Process according to claim 3 wherein the Ziegler catalyst is used in combination with an aluminum trialkyl containing up to 4 carbon atoms in each alkyl group.
7. Process according to claim 1 wherein the Ziegler catalyst contains a co-ordinated ligand selected from the class consisting of diethyl ether, tetrahydrofuran, ethyl alcohol, methyl alcohol, butyl alcohol, phenol, p-cresol, triethylamine, pyridine, triphenylphosphine, 1,2-bis(diphenylphosphino)ethane, thiodioxane, acetonitrile and benzonitrile.
8. The process of claim 1 wherein the α,ω-dinitrile is adiponitrile, the α,ω-diamine is hexamethylenediamine, and the Ziegler catalyst consists essentially of an organic acid salt of cobalt or nickel selected from cobalt or nickel octoates, acetates, propionates, benzoates and naphthenates, and an aluminium trialkyl wherein the alkyl contains from 2 to 4 carbon atoms.

References Cited
UNITED STATES PATENTS

| | | | |
|---|---|---|---|
| 3,143,542 | 8/1964 | Ziegler et al. | 260—239 |
| 3,231,515 | 1/1966 | Ziegler et al. | 252—430 X |
| 3,546,133 | 12/1970 | Ziegler et al. | 252—430 X |
| 3,260,752 | 7/1966 | Miller et al. | 260—583 K |

JOSEPH REBOLD, Primary Examiner

R. L. RAYMOND, Assistant Examiner

U.S. Cl. X.R.

252—429 A, 430